United States Patent [19]
Ayers

[11] Patent Number: 5,224,374
[45] Date of Patent: Jul. 6, 1993

[54] WAFER PROXIMITY SENSOR

[75] Inventor: Joe W. Ayers, Sherman, Tex.

[73] Assignee: Texas Instruments Incorporated, Dallas, Tex.

[21] Appl. No.: 914,687

[22] Filed: Jul. 15, 1992

Related U.S. Application Data

[62] Division of Ser. No. 709,917, May 31, 1991, Pat. No. 5,163,312.

[51] Int. Cl.⁵ .............................................. G01B 13/012
[52] U.S. Cl. .............................................................. 73/37.5
[58] Field of Search .................... 73/37.5, 37.6, 37.8; 29/25.01, 25.02; 33/DIG. 2

[56] References Cited

U.S. PATENT DOCUMENTS

| | | | |
|---|---|---|---|
| 3,400,573 | 9/1968 | Matter | 73/37.5 |
| 4,142,401 | 3/1979 | Wilson | 73/37.5 |
| 4,607,525 | 8/1986 | Turner et al. | 73/37.5 |

FOREIGN PATENT DOCUMENTS

| | | | |
|---|---|---|---|
| 169134 | 9/1984 | Japan | 73/37.5 |
| 659897 | 4/1979 | U.S.S.R. | 73/37.5 |

OTHER PUBLICATIONS

IBM Technical Disclosure Bulletin vol. 6, No. 7, Dec. 1963, Fernekees et al.
IBM Technical Disclosure Bulletin, vol. 21; No. 8; Jan. 1979, Benzi et al.

*Primary Examiner*—Hezron E. Williams
*Assistant Examiner*—Nashmiya Ashraf
*Attorney, Agent, or Firm*—Richard L. Donaldson; Stanton C. Braden

[57] ABSTRACT

The distance between a semiconductor wafer and a bake/chill plate is determined by a feed back system using a flow meter. The wafer forms part of the feed back system by limiting the flow of air or gas between the wafer and bake/chill plate, the distance between the wafer and bake/chill plate determining the amount of flow of air or gas through the flow meter.

5 Claims, 2 Drawing Sheets

WAFER PROXIMITY SENSOR

This is a division of application Ser. No. 07/709,917, now U.S. Pat. No. 5,163,312, filed May 31, 1991.

FIELD OF THE INVENTION

This invention relates to semiconductor wafer processing, and more particularly to a wafer proximity sensor for sensing relative position of a semiconductor wafer to a bake or chill plate in a process chamber.

BACKGROUND OF THE INVENTION

Attempts to accurately control the relative position of a semiconductor wafer to a bake or chill plate includes capacitive proximity sensors which do not have resolution accurate enough to measure in small dimensional increments required. Reliability of capacitive proximity sensors on a hot bake or chill plate is poor.

Other attempts include placing sensors, either optical or mechanical, on the semiconductor wafer lift mechanism, thereby measuring the physical position of the mechanism and assuming that the wafer is in the proper position with reference to the bake or chill plate. Adjustment of these sensors is very difficult. Optical and mechanical sensors have a hysteresis characteristic which degrades their resolution. Also, a sensor arrangement of this kind cannot compensate for thermal expansion of parts in the mechanism, thereby making calibration very difficult.

BRIEF SUMMARY OF THE INVENTION

The invention is a closed loop servo system which utilizes an analog gas flow meter as a sensing element. A hole or orifice is drilled in the center of the bake or chill plate. A filtered, pressure regulated nitrogen or air supply is connected to a needle valve. A tee is installed between the needle valve and the orifice in the bake or chill plate. A hot wire anamometer type gas flow meter is connected to the tee. As a wafer is lowered closer to the bake or chill plate, the nitrogen or air flow from the orifice is restricted, thereby decreasing the flow through the orifice, and increasing the nitrogen or flow through the flow meter. An analog signal from the flow meter is sent to an analog-to-digital converter. The resultant digital signal is sent to a computer-controller where it is compared to a preprogrammed value. The computer then sends a signal to a step motor drive. The step motor then raises or lowers the wafer until the signal from the flow meter equals the preprogrammed signal value in the computer. At this point a null is effected and the spacing between the wafer and the bake or chill plate is maintained throughout the process.

In another embodiment, as the wafer is lowered toward the bake or chill plate, air or nitrogen flow is increased through the airflow meter. The amount of flow is digitized and compared with a preset value in a controller unit, and the height of the wafer above the bake or chill plate is adjusted.

The proximity sensor may be used in any application where a gas flow may be utilized between two objects.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
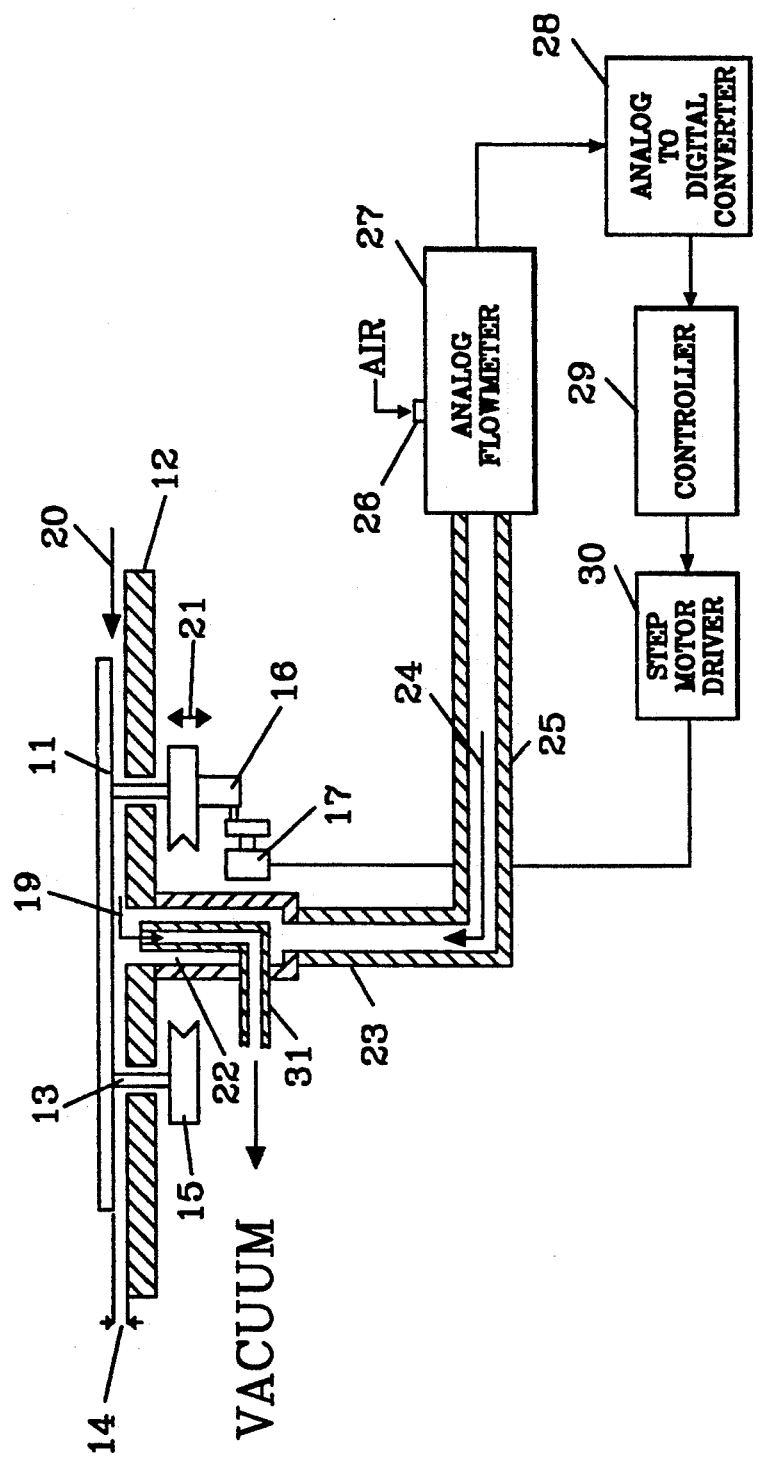
FIG. 1 illustrates wafer positioning based on air flow through a gas flow meter.

In FIG. 1, a semiconductor wafer 11 is supported above a bake or chill plate 12 by a plurality of pins 13 spaced around the bake or chill plate 12. Pins 13 are raised or lowered by plate 15 which is raised or lowered, as indicated by arrow 21, by cam follower 16. Cam follower 16 is moved by a cam follower attached to a stepper motor 17.

A vacuum line 31 pulls a vacuum, causing air to flow between wafer 11 and plate 12. Air flow is indicated by arrows 19 and 20. The vacuum also causes air to be drawn through analog flow meter 27. Air enters air flow meter 27 through inlet 26, flow through pipes 23 and 25, as indicated by arrow 24. Air will flow up pipe 23 and enter vacuum line 31 at the opening indicated by arrow 19.

As wafer 11 is lowered toward plate 12, the distance 14, between wafer 11 and plate 12 becomes smaller, constricting the air flow, arrow 20, between wafer 11 and plate 12. As air flow is decreased between wafer 11 and plate 12, the air flow through analog flow meter 27 will increase.

An analog signal from flow meter 27 is sent to an analog-to-digital converter 28. The resultant digital signal is sent to a computer-controller 29 where the signal is compared to a preprogrammed value. The computer then sends a signal to step motor driver 30. Step motor 17 then raises or lowers the wafer until the signal from the flow meter 27 equals the preprogrammed signal level in controller 29. At this point a null is effected and the spacing between wafer 11 and plate 12 is maintained throughout the process cycle. Stepper motor could also be a servo motor or hydraulic drive motor.

Figure 2:
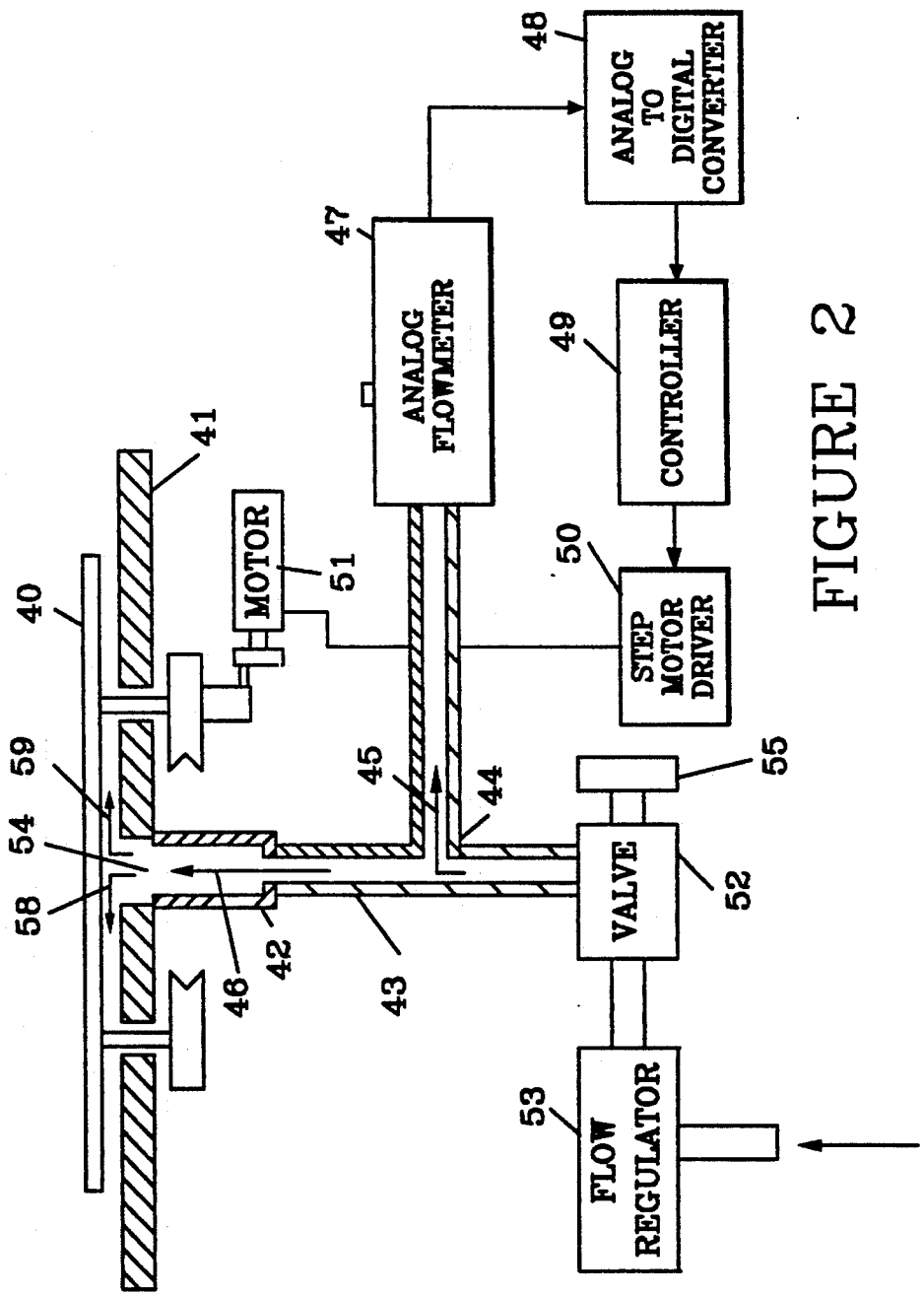
FIG. 2 is another embodiment of the invention.

FIG. 2 illustrates a second embodiment of the invention. In this embodiment, a positive pressure is used to monitor the distance of wafer 40 from plate 41. A filtered, pressure regulated air or gas, such as nitrogen, is introduced through flow regulator 53 and is connected to needle valve 52 having adjustment knob 55. A hole or orifice 54 is drilled in the center of the plate 41. A tee 44 is installed between the needle valve 52 and the orifice 54 in plate 41. A hot wire anamometer type gas flow meter 47 is connected to tee 44. As wafer 40 is lowered closer to the plate 41, the gas flow, arrows 58 and 59, from orifice 54 is restricted, thereby decreasing the gas flow through orifice 54, increasing the gas flow through the flow meter 47. An analog signal from flow meter 47 is sent to analog-to-digital converter 48. The resultant digital signal is sent to a computer-controller 49 where the digital signal is compared to a preprogrammed value. Controller 49 then sends a signal to a step motor drive 50. Step motor 51 then raises or lowers wafer 40 until the signal from the flow meter equals the preprogrammed signal value in the controller 49. At this point a null is effected and the spacing between the wafer and the plate is maintained throughout the process cycle.

What is claimed:

1. A system for maintaining a predetermined distance between a semiconductor wafer and the surface of a bake/chill plate, comprising:
   a bake/chill plate having an opening therein;
   a stepping mechanism for moving the semiconductor relative to the plate;
   a pressurized gas source connected to the opening in the plate;
   a pipe having a first end connected to the opening in the plate and a second end connected to the pressurized gas source;
   a tee section in the pipe between said first and second ends;
   a flow meter connected to said tee section;
   wherein when gas from said gas source is applied to said second end of said pipe, gas flows through the opening of said plate between the semiconductor wafer and the plate and through the tee to the flow meter, the ratio of the gas through the flow meter and the gas flow between the semiconductor wafer and the bake/chill plate indicative of the distance between the semiconductor wafer and the surface of the plate.

2. The system according to claim 1, wherein the flow meter is a hot wire anamometer.

3. The system according to claim 1, including a stepper motor and a motor driver in said control system for positioning said semiconductor wafer relative to the plate.

4. The system according to claim 1, wherein the output from the flow meter is an analog signal, and including an analog-to-digital converter for converting the analog signal to a digital signal.

5. The system according to claim 4, including a controller for comparing said digital signal against a preset value and positioning said semiconductor wafer according to the results of the comparison.

* * * * *